Figure 1:
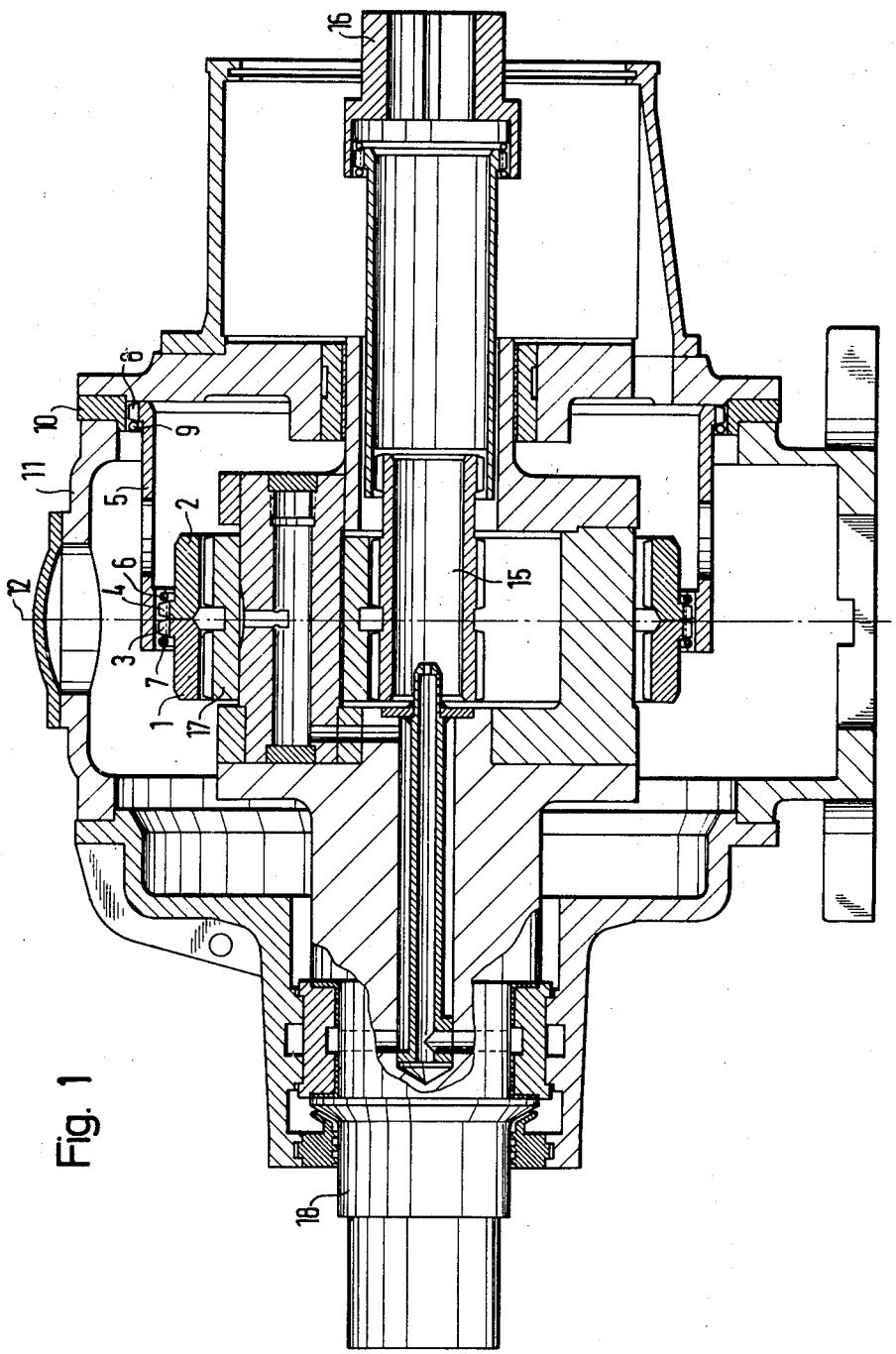

United States Patent

Ehrlenspiel et al.

[15] 3,686,968
[45] Aug. 29, 1972

[54] PLANETARY GEARING WITH HERRINGBONE TEETH

[72] Inventors: Klaus Ehrlenspiel, In Tannach 606; Horst Strinzel, Bergstrasse 5, both of 8972 Sonthofen, Germany

[22] Filed: Dec. 18, 1970

[21] Appl. No.: 99,425

[30] Foreign Application Priority Data

Dec. 19, 1969 Germany..........P 19 63 831.4

[52] U.S. Cl. ...................................................74/410
[51] Int. Cl. .............................................F16h 57/00
[58] Field of Search..............................74/410, 801

[56] References Cited

UNITED STATES PATENTS 3,424,035  1/1969  Heidrich..................74/410 X
2,936,655  5/1960  Peterson et al..........74/410 X

*Primary Examiner*—Leonard H. Gerin
*Attorney*—Woodhams, Blanchard & Flynn

[57] ABSTRACT

Planetary gearing with internal balancing and self-compensation for eccentricity. Mounting means for a planetary gear group are provided which effects automatic internal balancing thereof and provides for self-compensation for eccentricity. The planetary group is mounted through angularly aligned, oppositely directed, teeth at a first selected point on a mounting sleeve. Said mounting sleeve is itself supported at a point spaced axially from said first point. The angularly arranged but oppositely directed teeth of the first mentioned mounting effects internal balance of the planetary group to prevent axial shifting thereof and the sleeve mounting provides self-compensation for eccentricity.

5 Claims, 2 Drawing Figures

INVENTORS
KLAUS EHRLENSPIEL
HORST STRINZEL

ATTORNEYS

Patented Aug. 29, 1972

3,686,968

2 Sheets-Sheet 2

INVENTORS
KLAUS EHRLENSPIEL
HORST STRINZEL

BY
Woodhams, Blanchard & Flynn
ATTORNEYS

PLANETARY GEARING WITH HERRINGBONE TEETH

The invention relates to a planetary gearing with herringbone teeth, comprising an internal gear, two external gears which are connected to a gear box or slowly rotating shaft through a toothed clutch sleeve connection and with planet gears.

A known planetary gearing with herringbone teeth has two clutch sleeves on the internally toothed external gears, one of said clutch sleeves holding together the two external gears and the other one providing the connection to the gear box or slowly rotating shaft through clutch teeth. The purpose of these clutch sleeves is—like in a double toothed clutch—to provide a capacity for radial shifting of the external gears so that the external gears can adjust to equal loads on all planet gears and can balance eccentricity errors between planet carrier or slowly rotating gear shaft and gear box.

The manufacture of these two clutch sleeves of forged steel rings with a total of eight clutch teeth groups (including the tooth ring in the housing) is expensive.

The purpose of the present invention consists of producing a planetary gearing of the above-mentioned type which is less expensive to manufacture but has the same balancing effect and requires less expense.

This purpose is attained by the invention in such a manner that the clutch sleeve connection is constructed in one piece as one clutch sleeve. A simplification and money savings result from this and the same effect is obtained by advantageously saving two to three clutch teeth groups.

According to a further characteristic of the invention, the clutch sleeve has teeth which engage the teeth of both external gears through which the design is advantageously simplified.

Furthermore, according to another characteristic of the invention, the distance between the teeth of both external gears, which teeth cooperate with the clutch sleeve, is less than the distance between the central plane of such teeth and the clutch teeth connected to the housing or the main drive shaft. Through this both external gears shift radially practically at the same amount.

According to further characteristics of the invention, the clutch teeth can be constructed helically or as spur teeth, whereby, in the case of spur teeth, an easier and more advantageous mounting is obtained.

Figure 2:
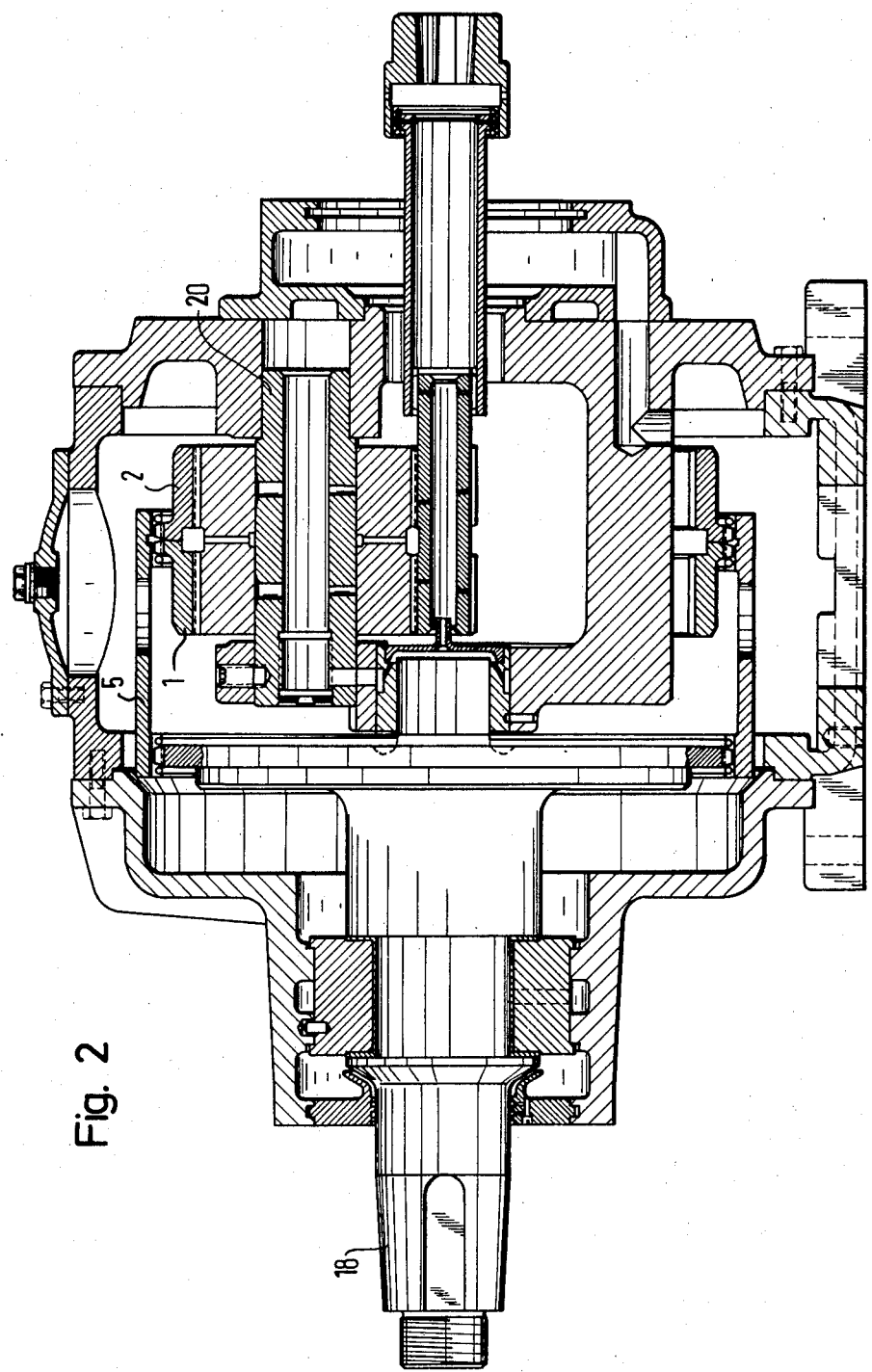

The invention will be described more in detail in connection with exemplary embodiments illustrated in the drawings, in which:

FIG. 1 illustrates a planetary gearing of the invention with a clutch connection to the gear box, FIG. 2 illustrates a planetary gearing of the invention with a clutch connection to the slowly rotating shaft.

The sun-and-planet gear according to FIG. 1 has a sun gear 15 connected to the main drive shaft 16, which sun gear engages planet gears 17 which are connected to the slowly rotating main drive shaft 18. The planet gears 17 are supported on the external gears 1 and 2 which are connected to the gear housing 11.

The two external gears 1 and 2 carry helical clutch teeth 3 and 4 with the same helix direction as the running teeth of the external gears. These clutch teeth are positioned closely together and engage corresponding teeth of the clutch sleeve 5. Two spring wire rings 6 and 7 prevent the axial shifting of the external gears. The clutch sleeve 5 is secured to the tooth ring 10 of the housing through the clutch teeth 8 and the spring ring 9.

If the housing 11 now has an eccentricity with respect to the set of gears, namely the axis of the planet carrier, then, when the gearing is loaded, the clutch sleeve 5 shifts radially for a corresponding amount at the clutch teeth 3 and 4 and balances this error.

Since the distance between the clutch teeth 3 and 4 is small compared with the distance between the center 12 of the set of gears and the clutch teeth 8, both external gears shift radially practically for the same amount. Remaining differences are balanced by the clearance in the clutch teeth.

It has been proven that this simplified suspension of the external gears results in a load balance which is just as effective as if several clutch sleeves were used.

The planetary gearing according to FIG. 2 is similarly constructed as the one according to FIG. 1 whereby, however, the planet carrier 20 is stationary. The clutch sleeve 5 connects hereby the external gears 1 and 2 to the slowly rotating shaft 18 and again a corresponding load balance is obtained as in the construction of FIG. 1.

A further simplification consists in that in place of the two assemblies of helical clutch teeth 3 and 4, spur clutch teeth are provided through which the mounting of the gearing is facilitated. A helix angle must then be provided between the running teeth of the external gears 1 and 2 and then be chosen in such a manner that both external gears are urged against one another when the gearing is under load, that is their axial thrust neutralizes each other. As a whole, the invention achieves an effective load balance with simplified and less expensive manufacture of the planetary gearing.

The embodiments of the invention in which an exclusive property or privilege is claimed are defined as follows:

1. In a planetary gear arrangement having a housing, an input shaft and an output shaft, a sun gear and a plurality of planet gears rotatably supported on a planet carrier, the improvement comprising:
   a pair of external ring gears each having internal teeth engaging said plurality of planet gears, each of said ring gears further having external teeth thereon; and
   a one-piece, hollow, clutch sleeve having internal teeth thereon telescoping over and engaging said external teeth on each of said ring gears and serving to connect said ring gears together and to one of said gear box and said output shaft.

2. The improvement according to claim 1, wherein said external teeth are helical of oppositely directed helices; and
   wherein said internal teeth on said clutch sleeve are herringbone teeth adapted to cooperate with the external teeth on both of said ring gears to thereby minimize the loading on said clutch sleeve.

3. The improvement according to claim 1, including clutch teeth for connecting said clutch sleeve to said one of said gear box and said output shaft; and
   wherein the distance between the external teeth of both external ring gears is less than the distance between a central plane between the internal teeth on said sleeve and said clutch teeth.

4. The improvement according to claim 1, wherein the teeth of the planetary gearing are constructed helically.

5. The improvement according to claim 1, wherein the teeth of the planetary gearing are parallel to the axis thereof.

* * * * *